US011912266B2

(12) United States Patent
Schomerus

(10) Patent No.: US 11,912,266 B2
(45) Date of Patent: Feb. 27, 2024

(54) METHOD FOR OPERATING A VEHICLE ASSISTANCE OR CONTROL SYSTEM

(71) Applicant: Volkswagen Aktiengesellschaft, Wolfsburg (DE)

(72) Inventor: Volker Patricio Schomerus, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 429 days.

(21) Appl. No.: 17/244,241

(22) Filed: Apr. 29, 2021

(65) Prior Publication Data
US 2021/0339739 A1 Nov. 4, 2021

(30) Foreign Application Priority Data

Apr. 30, 2020 (DE) ...................... 10 2020 205 549.1

(51) Int. Cl.
*B60W 30/08* (2012.01)
*G01S 17/931* (2020.01)
*G01S 7/00* (2006.01)

(52) U.S. Cl.
CPC ............. *B60W 30/08* (2013.01); *G01S 7/003* (2013.01); *G01S 17/931* (2020.01);
(Continued)

(58) Field of Classification Search
CPC ........ G01S 7/003; G01S 17/931; G01S 17/89; G01S 2013/9314; B60W 2420/52; B60W 2554/20; B60W 30/06
See application file for complete search history.

(56) References Cited

U.S. PATENT DOCUMENTS 9,711,047 B1 * 7/2017 Knas ................. G08G 1/143
10,368,036 B2 * 7/2019 Liu .................... G08G 1/04
(Continued)

FOREIGN PATENT DOCUMENTS

DE 102018204006 A1 9/2019 ............ B60W 30/08
DE 102018214697 A1 3/2020 ............... G06K 9/62

OTHER PUBLICATIONS

Kim, Seong-Woo et al., "Multivehicle Cooperative Driving Using Cooperative Perception: Design and Experimental Validation," IEEE Transactions on Intelligent Transportation Systems, vol. 16, No. 2, p. 663-680, Mar. 27, 2015.
(Continued)

*Primary Examiner* — Peter D Nolan
*Assistant Examiner* — Anwar Mohamed
(74) *Attorney, Agent, or Firm* — Slayden Grubert Beard PLLC

(57) ABSTRACT

The invention relates to a method for operating a vehicle assistance or control system with a vehicle and with an offboard obstacle recognition sensor for recognizing obstacles for the vehicle, wherein the vehicle includes an onboard obstacle recognition sensor for recognizing obstacles to the vehicle, wherein a first grid map is generated relative to the offboard obstacle recognition sensor, a second grid map relative to the onboard obstacle recognition sensor, or respectively relative to the vehicle, and wherein a consolidated grid map is generated depending on the first grid map and the second grid map.

18 Claims, 9 Drawing Sheets

(52) U.S. Cl.
CPC ..... *B60W 2420/52* (2013.01); *B60W 2554/80* (2020.02); *B60W 2556/45* (2020.02)

(56) References Cited

U.S. PATENT DOCUMENTS

| | | | |
|---|---|---|---|
| 11,724,742 B2* | 8/2023 | Feijoo | G06V 20/56 |
| | | | 701/41 |
| 2007/0182623 A1* | 8/2007 | Zeng | G01S 13/862 |
| | | | 342/174 |
| 2012/0299749 A1* | 11/2012 | Xiao | G08G 1/148 |
| | | | 340/932.2 |
| 2016/0355178 A1* | 12/2016 | Shiraishi | B62D 15/0285 |
| 2016/0368489 A1 | 12/2016 | Aich et al. | 701/41 |
| 2018/0012497 A1* | 1/2018 | Penilla | B60W 30/09 |
| 2018/0099661 A1* | 4/2018 | Bae | B62D 15/0285 |
| 2018/0194325 A1* | 7/2018 | Nordbruch | B60R 25/209 |
| 2018/0306587 A1* | 10/2018 | Holz | B66F 17/003 |
| 2018/0346029 A1 | 12/2018 | Kabos et al. | |
| 2020/0365029 A1* | 11/2020 | Kourous-Harrigan | |
| | | | G08G 1/163 |
| 2021/0190947 A1* | 6/2021 | Chang | G06V 20/586 |
| 2023/0236977 A1* | 7/2023 | Dev | G06F 12/0833 |
| | | | 711/118 |

OTHER PUBLICATIONS

German Office Action, Application No. 102020205549.1, 7 pages, dated Aug. 14, 2020.

* cited by examiner

METHOD FOR OPERATING A VEHICLE ASSISTANCE OR CONTROL SYSTEM

CROSS-REFERENCE TO RELATED APPLICATIONS

This application claims priority to German Patent Application No. DE 10 2020 205 549.1, filed on Apr. 30, 2020 with the German Patent and Trademark Office. The contents of the aforesaid Patent Application are incorporated herein for all purposes.

TECHNICAL FIELD

The invention relates to a method for operating a vehicle assistance or control system.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

US 2016/0368489 A1 discloses a parking assistance system in which a communication link between an external parking automation system and a vehicle is established, wherein the distance between a recognized object and the vehicle is measured. A vehicle braking control system is activated based on the measured distance. US 2016/0368489 A1 discloses a system for guiding motor vehicles based on image data.

SUMMARY

An object exists to present an improved, or respectively an alternative vehicle assistance or control system.

This object is solved by a method according to the independent claim(s). Embodiments of the invention are discussed in the dependent claims and the following description.

DESCRIPTION

Figure 1:
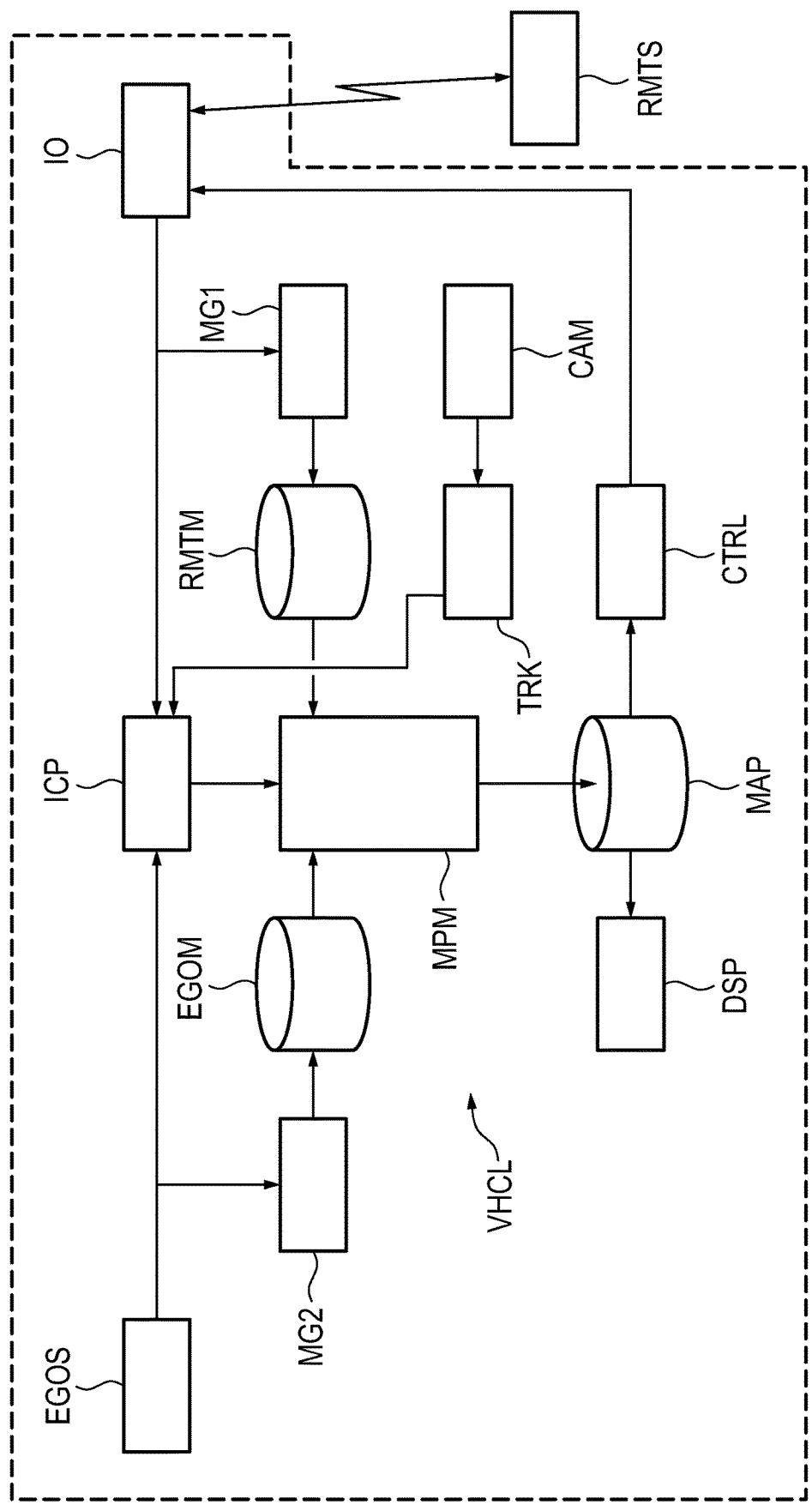
FIG. 1 shows an exemplary embodiment of a vehicle assistance or control system in a schematic.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In a first exemplary aspect, a method for operating a vehicle assistance or control system (herein also referred to as "means of transport assistance or control system") is provided with a vehicle (herein also referred to as "means of transport") and with an offboard obstacle recognition sensor for recognizing obstacles for the vehicle, wherein the vehicle includes an onboard obstacle recognition sensor for recognizing obstacles to the vehicle, wherein a first grid map is generated relative to the offboard obstacle recognition sensor, a second grid map relative to the onboard obstacle recognition sensor, or respectively relative to the vehicle, and wherein a consolidated grid map is generated depending on the first grid map and the second grid map. For example, it is provided that the grids feature the state "free", or respectively "not occupied", in the consolidated grid map that feature the state "free", or respectively "not occupied" in the first and/or second grid map.

In some embodiments, the state of grids that feature the vehicle as an obstacle are set to "free", or respectively "not occupied" in the first grid map or in the consolidated grid map.

In some embodiments, the consolidated grid map is generated depending on the alignment of the offboard obstacle recognition sensor relative to the vehicle, and/or relative to the onboard obstacle recognition sensor.

In some embodiments, the offboard obstacle recognition sensor includes a marker. In some embodiments, the vehicle includes at least one camera for recognizing the marker, as well as a tracking module for determining the angle of the position of the offboard obstacle recognition sensor relative to a reference axis of the vehicle, in particular however not the distance between the onboard obstacle recognition sensor and the offboard recognition sensor. A reference axis pursuant to this disclosure may for example be the longitudinal axis of a motor vehicle if the vehicle is a motor vehicle. In some embodiments, the alignment of the offboard obstacle recognition sensor relative to the vehicle and/or relative to the onboard obstacle recognition sensor is moreover determined depending on the angle, the output signal from the offboard obstacle recognition sensor, and the output signal from the onboard obstacle recognition sensor.

In some embodiments, the alignment of the offboard obstacle recognition sensor relative to the vehicle and/or relative to the onboard obstacle recognition sensor is determined depending on measured values from the offboard obstacle recognition sensor, and measured values from the onboard obstacle recognition sensor.

In some embodiments, the alignment of the offboard obstacle recognition sensor is determined relative to the vehicle, and/or relative to the onboard obstacle recognition sensor by means of an optimization and/or minimization of the distances between:
  rotated measured values of the offboard obstacle recognition sensor and shifted measured values of the onboard obstacle recognition sensor,
  rotated measured values of the onboard obstacle recognition sensor and shifted measured values of the offboard obstacle recognition sensor,
  rotated and shifted measured values of the offboard obstacle recognition sensor and measured values of the onboard obstacle recognition sensor, or
  rotated and shifted measured values of the onboard obstacle recognition sensor and measured values of the offboard obstacle recognition sensor.

In some embodiments, the rotation does not include more than one degree of freedom, and the shift does not include more than two degrees of freedom. In some embodiments, the offboard obstacle recognition sensor includes a marker by means of which an angle of the position of the offboard obstacle recognition sensor is determined relative to a reference axis of the vehicle, in particular however not to the distance between the onboard obstacle recognition sensor and the offboard obstacle recognition sensor. In some embodiments, the shift by means of the angle is reduced by one degree of freedom.

In some embodiments, a LIDAR is used as the onboard obstacle recognition sensor and/or as the offboard obstacle recognition sensor.

In some embodiments, the measured values of the offboard obstacle recognition sensor are transmitted wirelessly from the offboard obstacle recognition sensor to the onboard optical recognition sensor.

In some embodiments, the offboard obstacle recognition sensor is arranged in front of a parking space or a parking bay. In some embodiments, the or another offboard obstacle recognition sensor is arranged in a parking space or a parking bay.

In a further exemplary aspect, a vehicle of an aforementioned vehicle assistance or control system is provided, for example a vehicle with an onboard obstacle recognition sensor for recognizing obstacles to the vehicle, and with a receiving apparatus for receiving an output signal from an offboard obstacle recognition sensor for recognizing obstacles (to the vehicle), wherein the vehicle comprises a synchronization module for determining the alignment, or respectively the pose of the offboard obstacle recognition sensor relative to the vehicle, and/or relative to the onboard obstacle recognition sensor.

In some embodiments, it may be provided that the grid map is displayed, or respectively portrayed in the vehicle by means of a display. In some embodiments, it may be provided that the vehicle is displayed integrated in the grid map. Alternatively or in addition, it may be provided in some embodiments that the grid map of a control serves to automatically park or guide the vehicle.

Some embodiments provide that information in the grid map having the vehicle as an obstacle is removed.

In some embodiments, the vehicle assistance or control system may include for example a wireless communication system for transmitting an output signal from the offboard obstacle recognition sensor to the receiving apparatus.

In some embodiments, the offboard obstacle recognition sensor is arranged in front of a parking space or a parking bay.

In some embodiments, the or another offboard obstacle recognition sensor is moreover arranged in a parking space or a parking bay.

It may be provided that the offboard obstacle recognition sensor is not stationary in some embodiments. In this case, it may for example be provided that the offboard obstacle recognition sensor is part of an autonomously driving robot, or is mounted on such a robot.

Offboard pursuant to this disclosure means, e.g., not part of the vehicle, or respectively not connected to the vehicle in a fixed manner. Onboard pursuant to this disclosure means, e.g., the opposite of offboard. Onboard pursuant to this disclosure means, e.g., integrated in a vehicle, or at least fixedly connected thereto.

Output signal relative to onboard obstacle recognition sensors and offboard obstacle recognition sensors is synonymous with measured values from these sensors, or at least containing measured values from these sensors.

A grid map pursuant to this disclosure is, e.g., synonymous with an occupancy grid map, or respectively with a grid map. It may for example be provided that the grids (or also the cells) of the (occupancy) grid map can assume at least two different states: One state that displays that an obstacle is present in the grid, or respectively the cell, and one state which displays that there is no obstacle in the grid, or respectively the cell. It may however also be provided that at least three states are displayed in the grid map, wherein the third state indicates that it is unknown whether the grid or the cell is or is not occupied, i.e., that it is unknown whether an obstacle is or is not present in the grid or the cell.

A measured value synchronization algorithm pursuant to this disclosure may for example be an ICP algorithm. An ICP, or respectively iterative closest point algorithm pursuant to this disclosure, is, e.g., an algorithm that makes it possible to adapt point clouds to each other. For using the method, it may for example be provided that the point clouds are, or respectively will be approximately aligned with each other beforehand. When the algorithm is being executed, it is for example attempted to bring the point clouds in alignment with each other as best as possible by rotation and translation. Starting with a set of approximately determined initial transformation parameters for rotation and translation, the next point (closest point) from the other point cloud is determined for each point from the one point cloud. Then the sum S, e.g., of the squares, of the distances of all of these point pairs is formed. This yields a measure of the quality of correspondence between the point clouds. The goal, e.g., is to minimize this optimization measure, i.e., the above sum S, by changing the transformation parameters. To determine the suitable transformation parameters, there are different approaches that are partially based on the structure of the underlying point clouds. A corresponding iterative process is continued until an acceptable optimum is found, or is terminated if a desirable optimum cannot be found, or respectively ascertained. It is for example provided (see above) that the alignment of the offboard obstacle recognition sensor is determined relative to the vehicle, and/or relative to the onboard obstacle recognition sensor by means of an optimization and/or minimization of the distances between:

- rotated measured values of the offboard obstacle recognition sensor and shifted measured values of the onboard obstacle recognition sensor,
- rotated measured values of the onboard obstacle recognition sensor and shifted measured values of the offboard obstacle recognition sensor,
- rotated and shifted measured values of the offboard obstacle recognition sensor and measured values of the onboard obstacle recognition sensor, or
- rotated and shifted measured values of the onboard obstacle recognition sensor and measured values of the offboard obstacle recognition sensor.

It may for example be provided that the rotation does not include more than one degree of freedom, and the shift does not include more than two degrees of freedom. The function underlying the optimization is for example as follows:

$$S(R, T) = \frac{1}{N} \sum_{i=1}^{N} \| EGOS_i - R \cdot RMTS_i - T \|^2$$

N is the number of point pairs from the two point clouds that are provided for the optimization. These are, e.g., adjacent measured values. R stands for the rotation and T stands for the translation, or respectively the shift. $EGOS_i$ stands for an i-th measured value (possibly minus the center of gravity of the N measured values) of the onboard optical recognition sensor. The corresponding holds true for $RMTS_i$ relative to the offboard obstacle recognition sensor pursuant to this disclosure; however, it may for example be provided that the equation is not three-dimensional, but only two dimensional. Accordingly, the equation can also be presented as follows:

$$S(R, xT, yT) = \frac{1}{N} \sum_{i=1}^{N} \left\| \begin{bmatrix} xEGOS_i \\ yEGOS_i \end{bmatrix} - R \cdot \begin{bmatrix} xRMTS_i \\ yRMTS_i \end{bmatrix} - \begin{bmatrix} xT \\ yT \end{bmatrix} \right\|^2$$

$xEGOS_i$ identifies the x-component of an i-th measured value (if applicable minus the center of gravity of the N measured values) of the onboard obstacle recognition sensor, and $yEGOS_i$ identifies the corresponding value in the y direction. The same holds true for $xRMTS_i$ and $yRMTS_i$ relative to the offboard obstacle recognition sensor. xT identifies the shift, or respectively translation in the x direction, and yT identifies the translation, or respectively shift in the y direction.

Additionally, it may for example be provided that to determine by another method the angle of the position of the offboard obstacle recognition sensor relative to a reference axis of the vehicle, e.g., however not the distance between the onboard obstacle recognition sensor and the offboard obstacle recognition sensor, for example by a marker on the offboard obstacle recognition sensor. In this manner, the number of degrees of freedom decreases from three to two. Whereas the above equation includes three degrees of freedom, i.e., one rotational degree of freedom and two translatory degrees of freedom, the following optimization equation results from taking into account the angle θ relative to a reference axis such as the one for a longitudinal axis of a vehicle:

$$S(R, xT) = \frac{1}{N} \sum_{i=1}^{N} \left\| \begin{bmatrix} xEGOS_i \\ yEGOS_i \end{bmatrix} - R \cdot \begin{bmatrix} xRMTS_i \\ yRMTS_i \end{bmatrix} - \begin{bmatrix} xT \\ xT \cdot \tan\theta \end{bmatrix} \right\|^2$$

The optimization therefore only still has to be determined for two degrees of freedom, i.e., for one rotational degree of freedom relative to the rotation R, and one translatory degree of freedom xT. If there is an insufficient number of measured values, the supplementation of the measured values may be supplemented from the past. A SLAM algorithm may for example be used for this.

Instead of simplifying the optimization by reducing the degrees of freedom, it may also be provided in some embodiments to use the determination of the angle for the plausibility of, or query for, autonomous driving. Accordingly for example autonomous driving of the vehicle can only be permitted if:

$$\Delta \geq \left| 1 - \frac{yT}{xT \cdot \tan\theta} \right|$$

A vehicle pursuant to this disclosure may be a means of conveyance or means of transport. A vehicle pursuant to this disclosure may be a vehicle for conveying persons and/or goods, or respectively understood as such. A vehicle pursuant to this disclosure may be a driven vehicle. A driven vehicle pursuant to this disclosure means for example that a technical drive is provided, wherein it may be provided that essential parts of the drive are arranged outside of the vehicle, however for example also within the vehicle, or respectively integrated with the vehicle. A driven vehicle pursuant to this disclosure is for example a vehicle that is not significantly driven by the power of animals and/or humans. A driven vehicle pursuant to this disclosure may however optionally include being driven by the wind and/or sun. A drive pursuant to this disclosure may be an internal combustion engine and/or an electric motor. A driven vehicle pursuant to this disclosure is for example a land vehicle and/or a motor vehicle. A motor vehicle pursuant to this disclosure is for example a vehicle that may be used individually in road traffic. Motor vehicles pursuant to this disclosure are not limited to land vehicles with internal combustion engines. A motor vehicle may also be understood to be a vehicle driven by a motor pursuant to this disclosure, for example a vehicle for 3D mobility as well. A vehicle pursuant to this disclosure is for example a truck, especially a truck with a tractor and a semitrailer. The semitrailer may for example be a container.

Reference will now be made to the drawings in which the various elements of embodiments will be given numerical designations and in which further embodiments will be discussed.

In the exemplary embodiments, the described components of the embodiments each represent individual features that are to be considered independent of one another, in the combination as shown or described, and in combinations other than shown or described. In addition, the described embodiments can also be supplemented by features of the invention other than those described.

Specific references to components, process steps, and other elements are not intended to be limiting. Further, it is understood that like parts bear the same or similar reference numerals when referring to alternate FIGS. It is further noted that the FIGS. are schematic and provided for guidance to the skilled reader and are not necessarily drawn to scale. Rather, the various drawing scales, aspect ratios, and numbers of components shown in the FIGS. may be purposely distorted to make certain features or relationships easier to understand.

FIG. 1 shows a vehicle assistance or control system that includes at least one offboard obstacle recognition sensor RMTS as well as a vehicle such as a motor vehicle VHCL, for example a truck. The vehicle, or respectively motor vehicle VHCL includes an onboard obstacle recognition sensor for recognizing obstacles to the vehicle, and a receiving apparatus IO for receiving an output signal from the offboard obstacle recognition sensor RMTS. The data may be exchanged between the vehicle VHCL and the offboard obstacle recognition sensor RMTS via a separate wireless communications link, or via a signal by means of which the obstacle is recognized.

The vehicle, or respectively vehicle VHCL furthermore includes a synchronization module for determining the alignment of the offboard obstacle recognition sensor RMTS relative to the vehicle, or respectively vehicle VHCL, or respectively relative to the onboard obstacle recognition sensor EGOS. In the present exemplary embodiment, the synchronization module includes a module ICP in which a measured value synchronization algorithm such as for example an ICP algorithm is implemented. In a supplementary embodiment, "1D tracking" may occur, for example marker-based "1D tracking" by the offboard optical recognition sensor RMTS. To accomplish this, the vehicle, or respectively vehicle VHCL may have a camera system CAM whose output signal, or respectively output signals, are evaluated by a tracking module TRK so that the direction (angle relative to a reference axis) of the vehicle, or respectively vehicle VHCL, to the offboard obstacle recognition sensor RMTS is determined.

The vehicle, or respectively vehicle VHCL moreover comprises a map generator MG2 for generating a grid map EGOM from the output signal of the onboard obstacle recognition sensor EGOS. In the grid map EGOM, the environment of the vehicle VHCL is reproduced in the form of a grid whose grid areas as for example portrayed in FIG. 3 may include the state "unknown" U, the state "free" F, and the state "occupied" B. Moreover, the vehicle VHCL includes a map generator MG1, by means of which a grid map RMTM is generated from the output signal of the offboard obstacle recognition sensor RMTS. A combination module MPM combines the grid map EGOM and the grid map RMTM into a (consolidated) integrated grid map as for example portrayed in FIG. 5 depending on the pose, or respectively orientation of the vehicle VHCL to the offboard obstacle recognition sensor RMTS. In doing so, grid areas are not displayed as occupied but rather as free which correspond to obstacles recognized by the offboard obstacle recognition sensor RMTS as belonging to the vehicle, or respectively vehicle VHCL.

It may for example be provided that the grid map MAP is displayed by means of a display DSP of the vehicle VHCL, and/or is used by a control CTRL to move the vehicle VHCL (autonomously).

Figure 2:
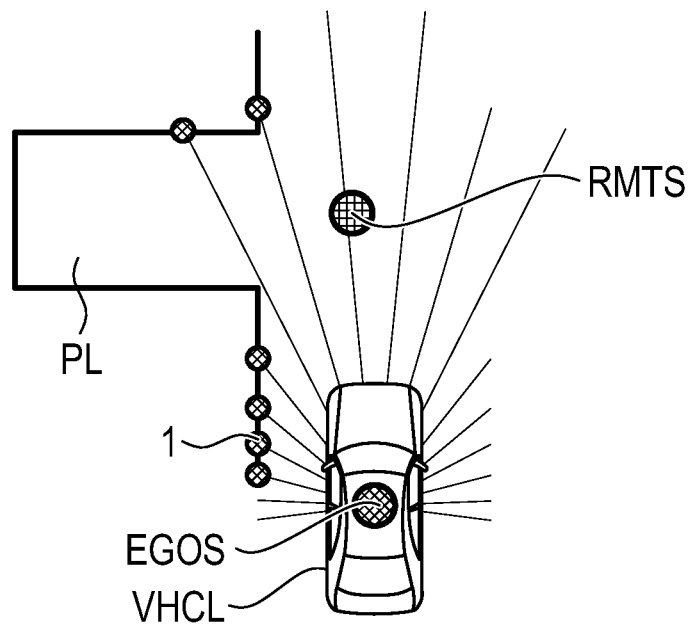
FIG. 2 shows an exemplary scenario of a motor vehicle that is approaching a parking space, wherein a vehicle assistance or control system according to FIG. 1 is provided for assistance.
Figure 4:
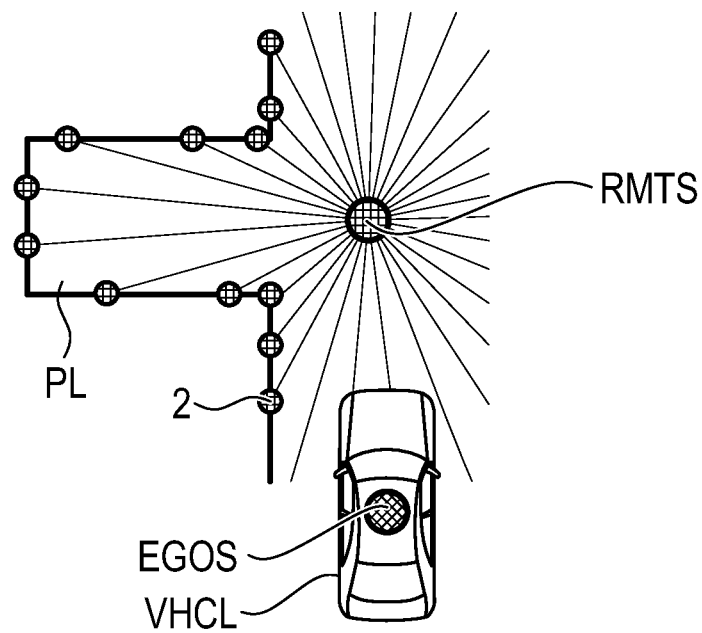
FIG. 4 shows the situation according to FIG. 2, but while showing measuring points by means of an offboard obstacle recognition sensor.

The functioning of the aforementioned vehicle assistance or control system is explained with reference to the following FIGS. FIG. 2 as well as FIG. 4 show a scenario with a parking space PL. The points are identified by reference sign 1 that are recognized by the offboard obstacle recognition sensor RMTS as an obstacle, and the points are identified by reference sign 2 that are recognized by the onboard obstacle recognition sensor EGOS as an obstacle.

Figure 3:
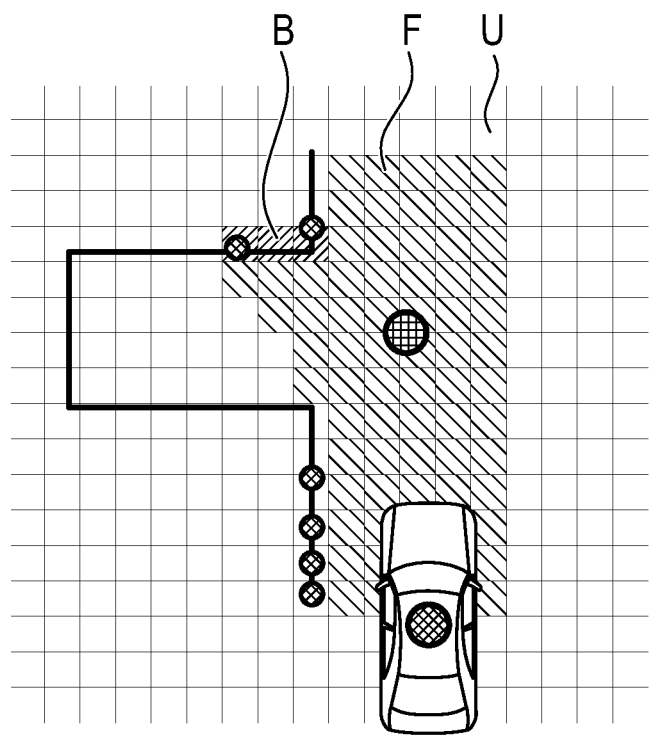
FIG. 3 shows a grid map corresponding to the scene from FIG. 2.
Figure 5:
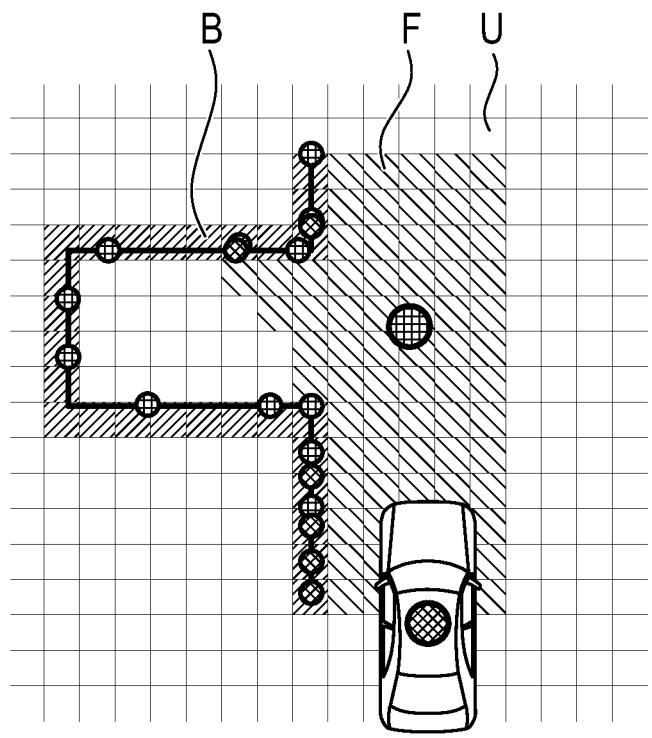
FIG. 5 shows an exemplary embodiment of a grid matrix based on measuring points that have been obtained by means of an onboard obstacle recognition sensor and an offboard obstacle recognition sensor.

FIG. 3 shows the corresponding grid map EGOM that is obtained by evaluating the output signal from the onboard obstacle recognition sensor EGOS. The vehicle VHCL and the offboard obstacle recognition sensor RMTS are only portrayed for better orientation in the grid map EGOM. However in one embodiment, they may also be part of the grid map EGOM. FIG. 4 shows the parking space with the points that are recognized by the offboard obstacle recognition sensor RMTS as obstacles (see above). The resulting grid map MAP is shown in FIG. 5. The scenario with respect to FIGS. 2, 3, 4 and 5 refers to a placement of the offboard obstacle recognition sensor RMTL in front of the parking bay PL.

Figure 6:
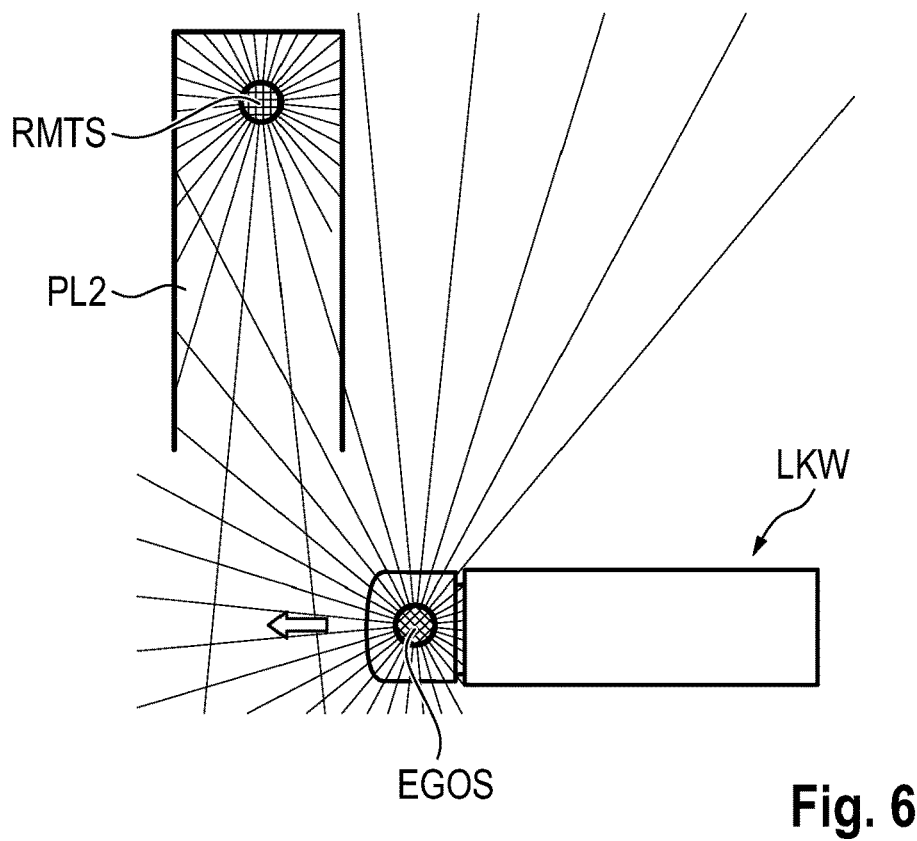
FIG. 6 shows a situation in which a truck is approaching a parking space.
Figure 7:
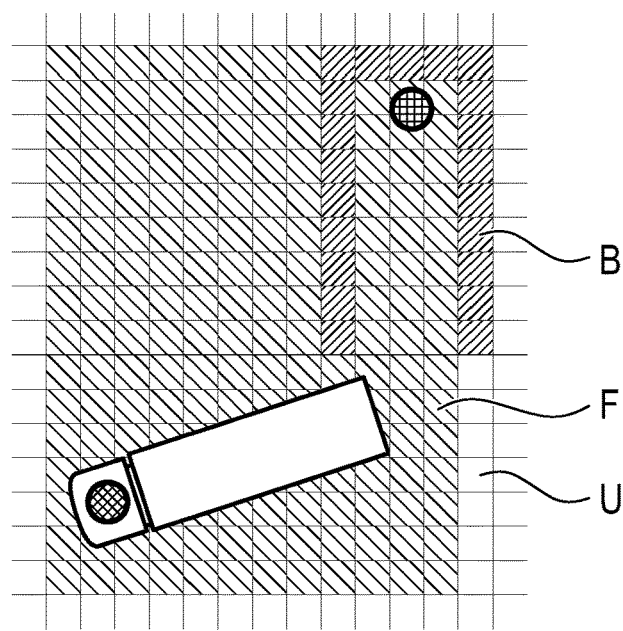
FIG. 7 shows an exemplary embodiment of a grid map with respect to a situation in which a truck is approaching the parking space according to FIG. 6 while parking in reverse.
Figure 8:
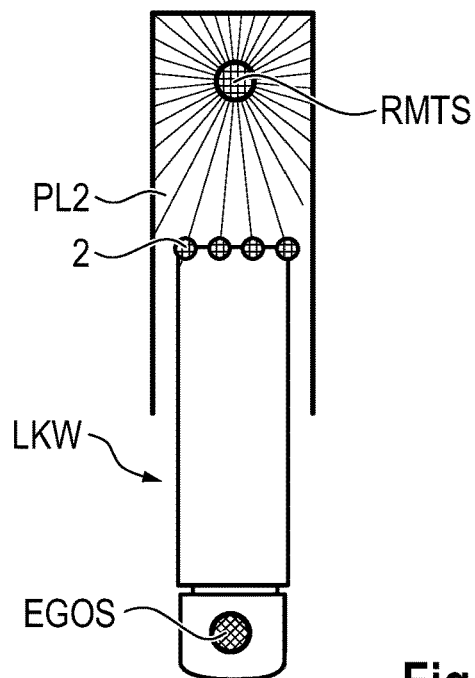
FIG. 8 shows an exemplary embodiment of a development of the situation according to FIG. 6, wherein the truck is parking in the parking space according to FIG. 6 in reverse with the assistance of an offboard obstacle recognition sensor.

FIG. 6 shows another scenario, wherein the vehicle VHCL is a semitrailer truck LKW, wherein the onboard obstacle recognition sensor is arranged in the tractor ZM, but not however in the semitrailer AUFL. Moreover, the offboard obstacle recognition sensor RMTS is arranged in the interior of the parking space PL2. FIG. 7 shows the situation in which the truck has traveled past the parking space PL2 using a corresponding grid map MAP. A parking maneuver by the truck is shown that is continued in FIG. 8.

Figure 9:
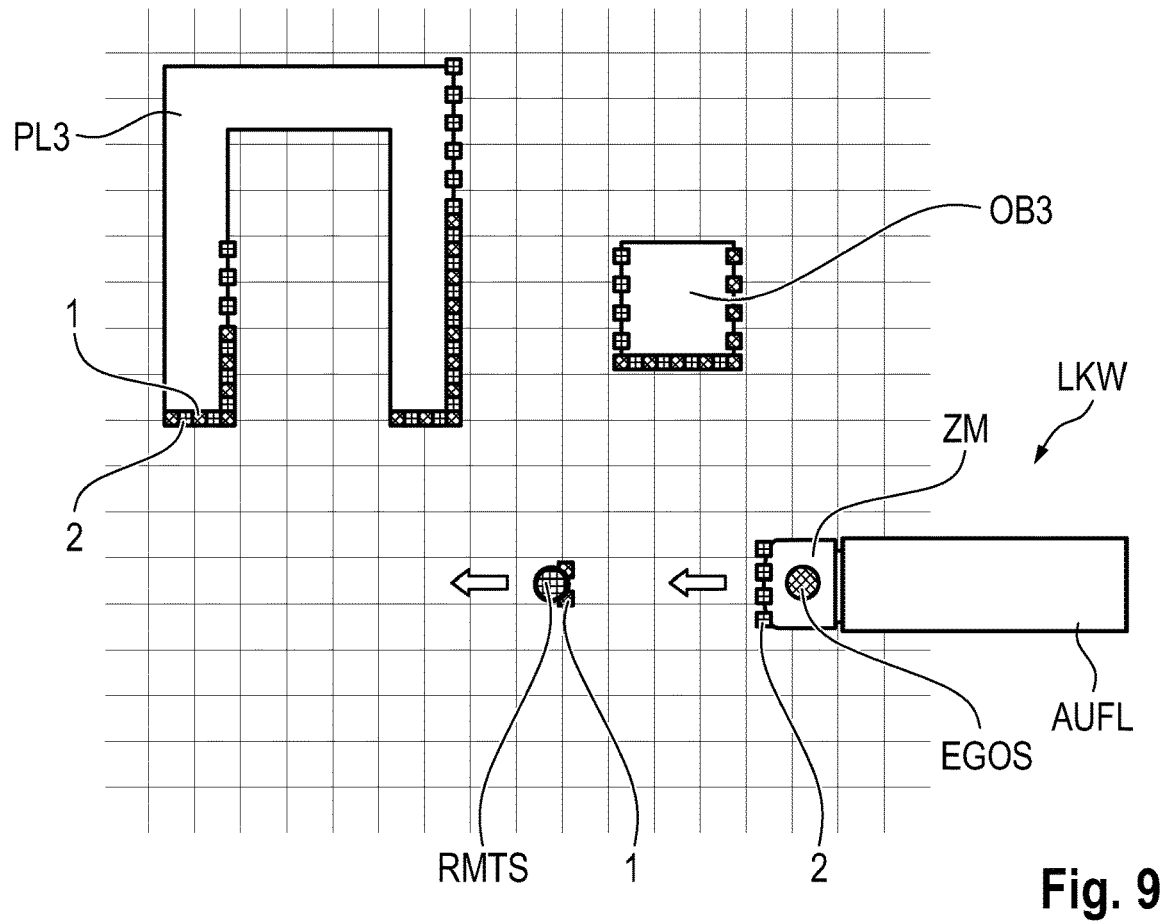
FIG. 9 shows an exemplary embodiment of another scenario with a parking space and an obstacle object, and using a mobile offboard obstacle recognition sensor for use as a guide or pilot for a truck with an onboard optical recognition sensor.
Figure 10:
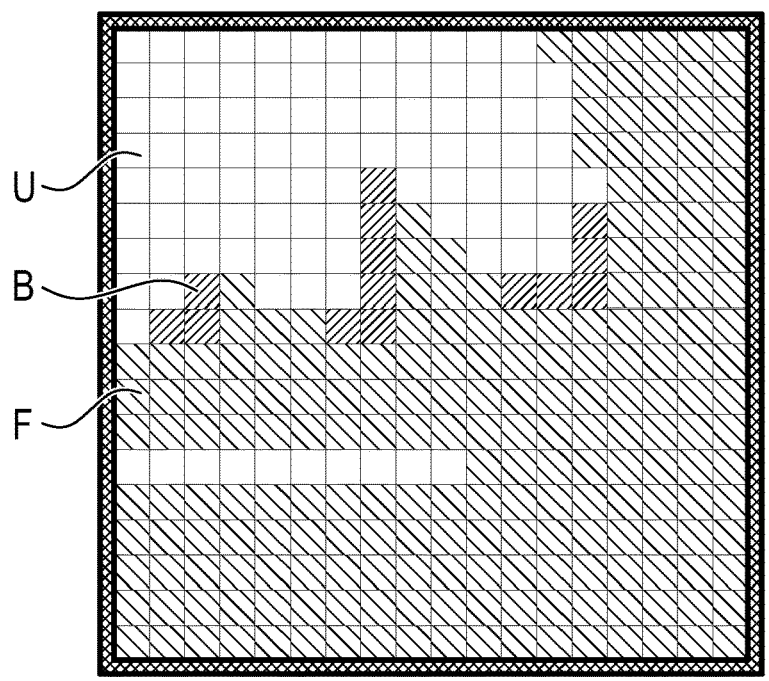
FIG. 10 shows an exemplary embodiment of a grid map using the output signal of the onboard obstacle recognition sensor according to FIG. 9, but without the offboard obstacle recognition sensor as an obstacle.
Figure 11:
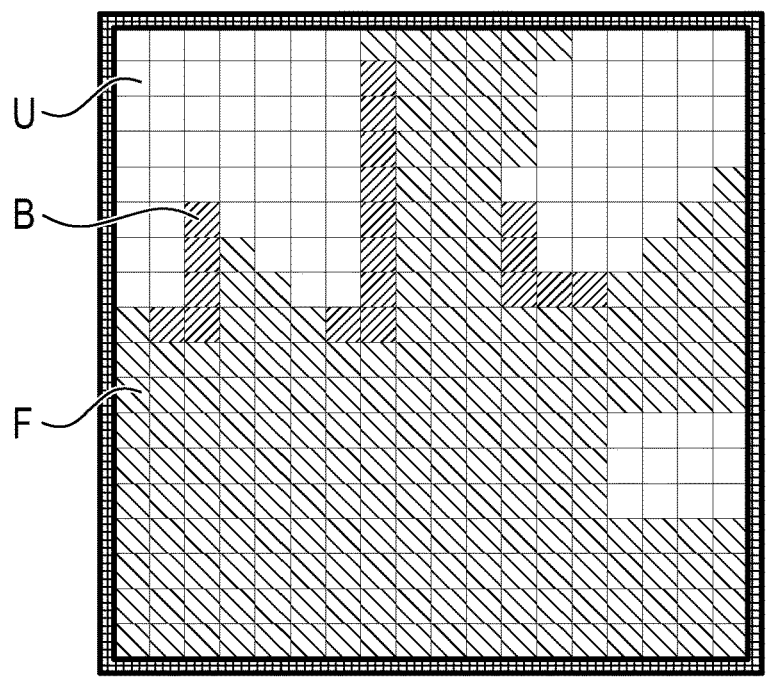
FIG. 11 shows an exemplary embodiment of a grid map using the output signal from the mobile offboard obstacle recognition sensor, but without the truck as an known obstacle.
Figure 12:
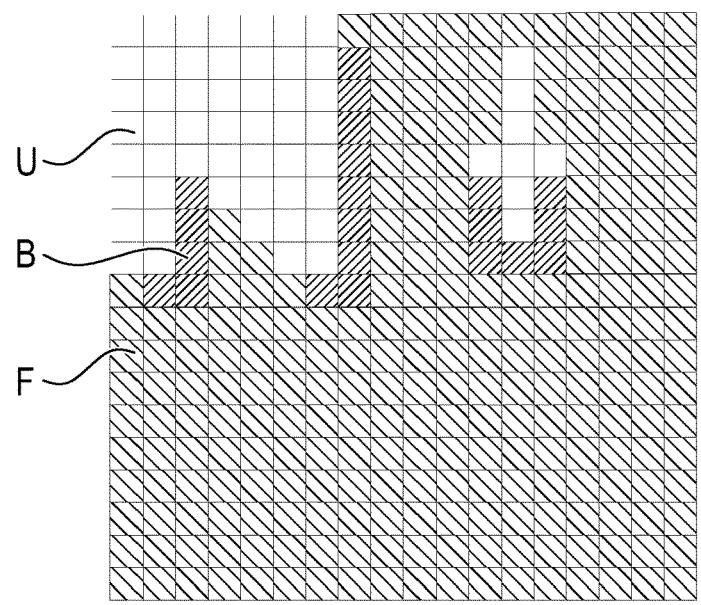
FIG. 12 shows a superposition of the grid maps according to FIG. 10 and FIG. 11 to form a consolidated grid map for use to control the truck.
Figure 13:
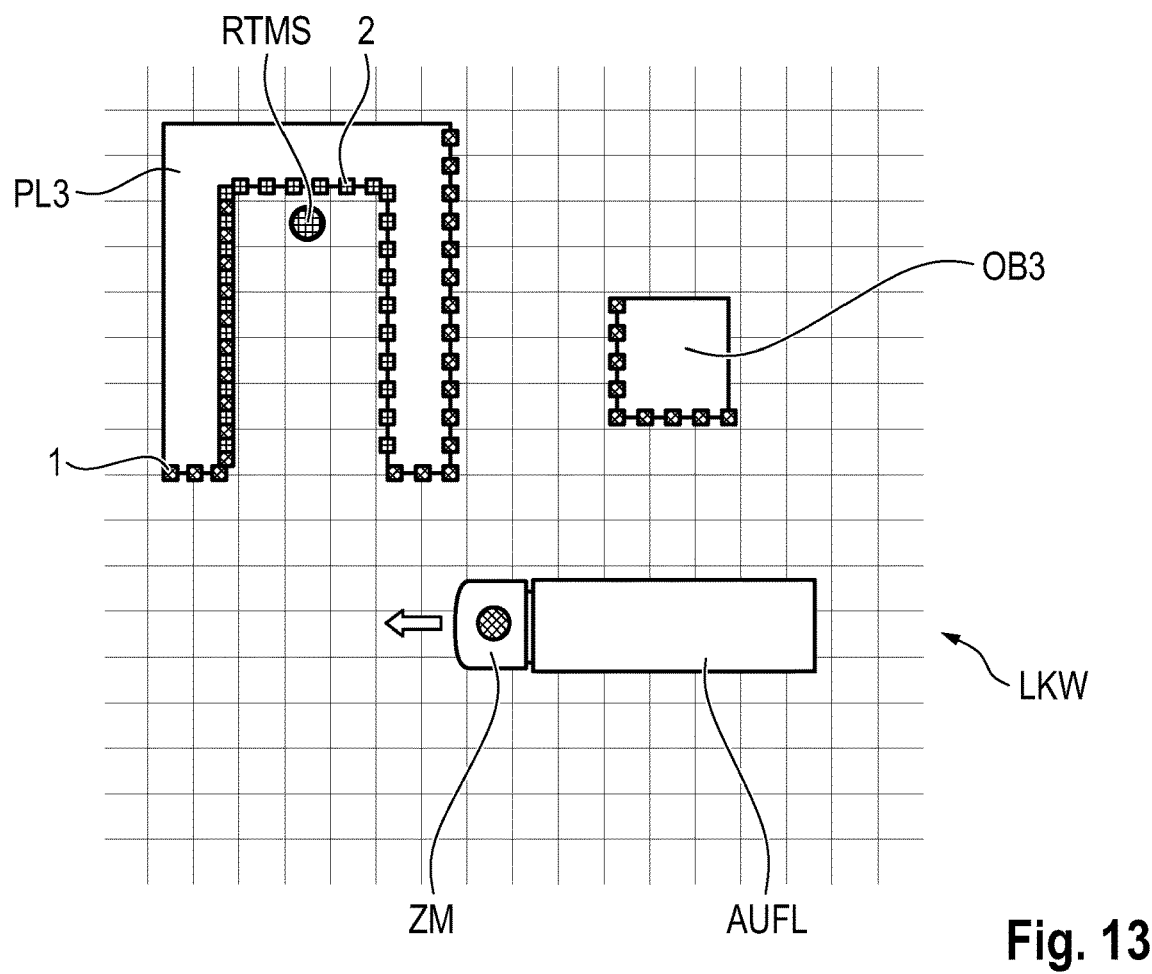
FIG. 13 shows an exemplary embodiment of the development of the situation according to FIG. 9, wherein the truck is approaching the parking space, and the mobile offboard obstacle recognition sensor has been moved into the parking space.
Figure 15:
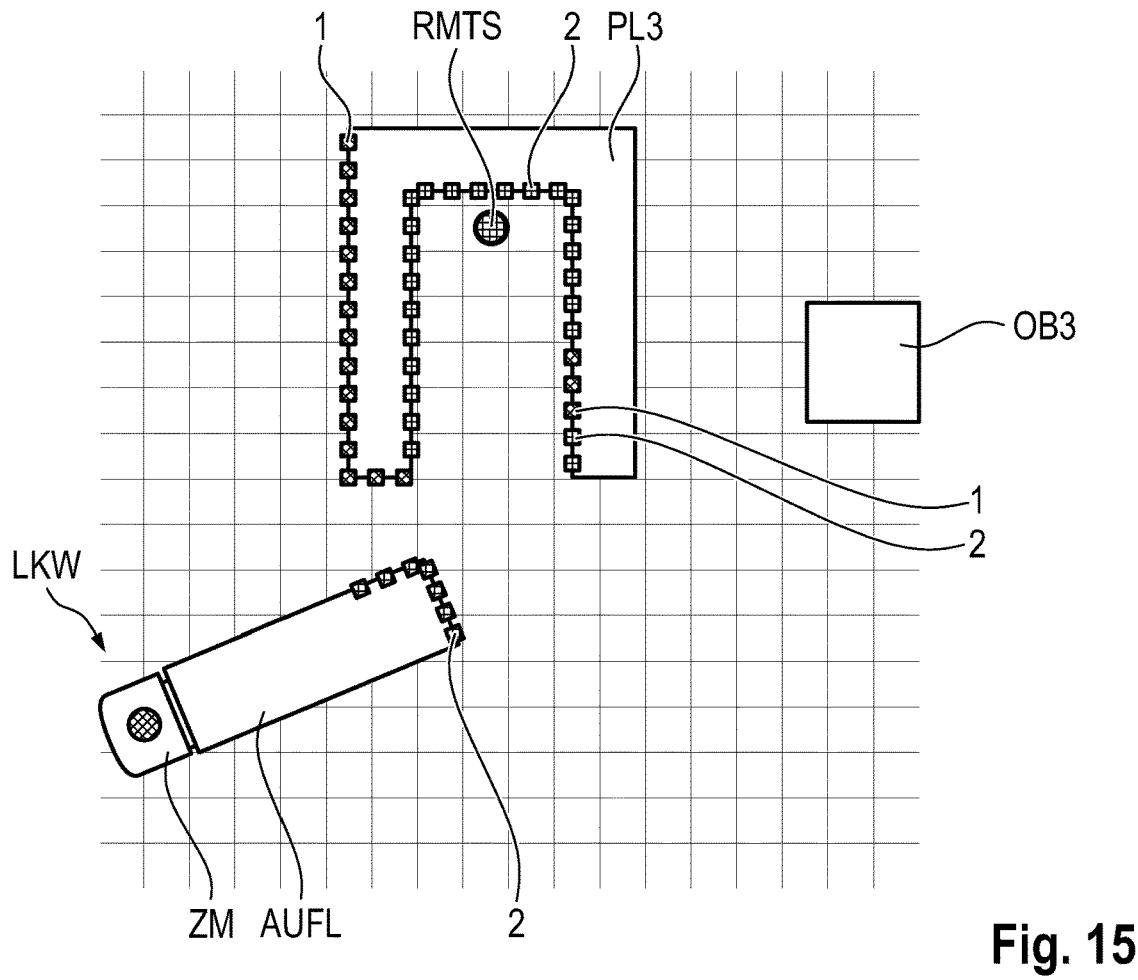
FIG. 15 shows an exemplary embodiment of a development of the situation according to FIG. 13, wherein the truck is executing a maneuver to park in the parking space with the support of the offboard obstacle recognition sensor.

FIG. 9, FIG. 13 and FIG. 15 show various scenes from another scenario, or respectively exemplary embodiment of an aforementioned vehicle assistance or control system. Reference sign PL3 identifies the edge of a parking bay, and OB3 identifies another obstacle. The goal is to park the semitrailer truck LKW in the parking bay that is formed by the border PL3. In the portrayed scenario, or respectively in the scene portrayed in FIG. 9, the offboard obstacle recognition sensor RMTS is not stationary, but is rather arranged on an autonomously driving robot vehicle. As an autonomously operating guide or pilot, the offboard obstacle recognition sensor RMTS guides the semitrailer truck to the desired parking space and assists with parking as portrayed in the following with reference to the FIGS.: For explanation, FIG. 10 and FIG. 11 initially show the grid maps EGOM and RMTM with the particular partner removed as an obstacle. That is, FIG. 10 shows the grid map EGOM, wherein the offboard obstacle recognition sensor recognized as an obstacle is not portrayed as an obstacle but rather as an unknown area U including the projected "obstructed vision", and FIG. 11 shows the grid map EGOM, wherein the offboard obstacle recognition sensor recognized as an obstacle is not portrayed as an obstacle but rather as an unknown area U including the projected "obstructed vision". The combination of the grid maps portrayed in FIG. 10 and FIG. 11 yields the grid map MAP according to FIG. 12.

Figure 14:
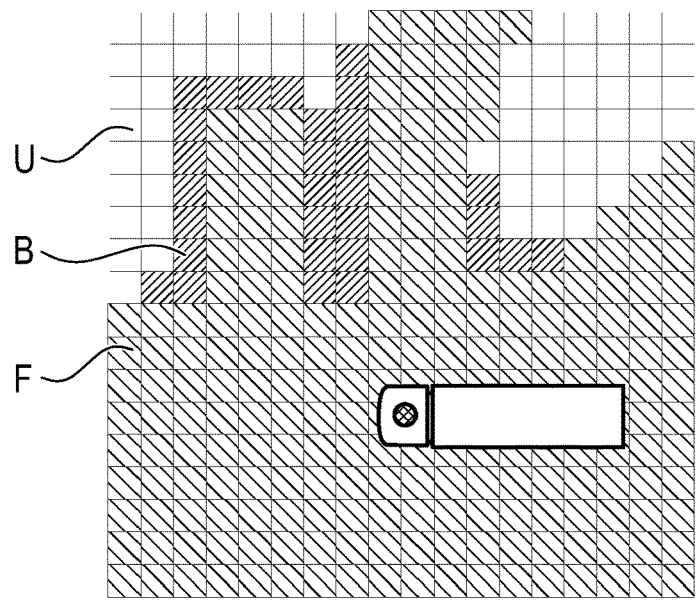
FIG. 14 shows an exemplary embodiment of a consolidated grid map, wherein an image of the truck is inserted for orientation that does not necessarily belong to the grid map.
Figure 16:
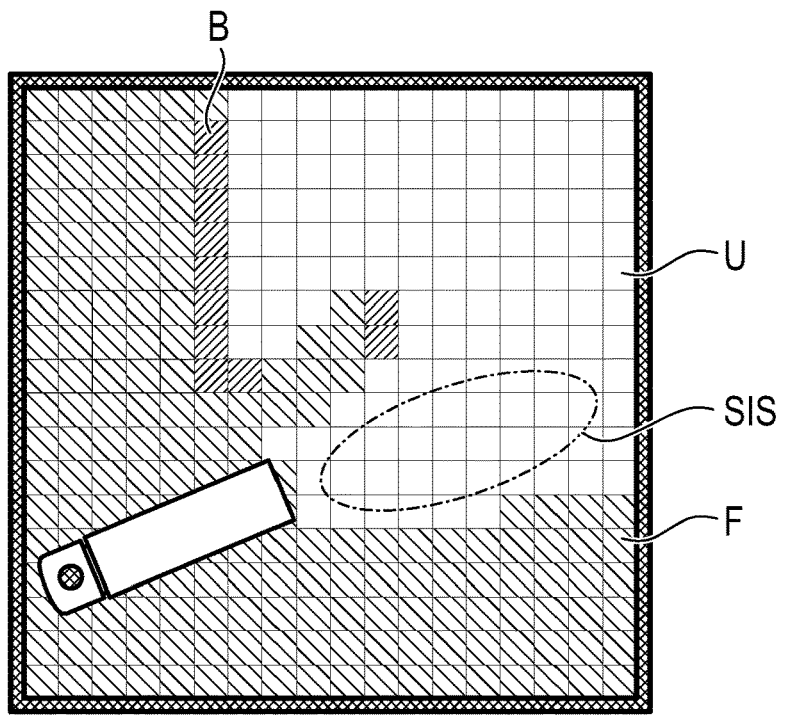
FIG. 16 shows an exemplary embodiment of a grid map based on the output signal from the onboard obstacle recognition sensor of the truck, wherein the onboard obstacle recognition sensor is arranged on the tractor of the truck, and a semitrailer of the truck causes a blind spot behind the truck.
Figure 17:
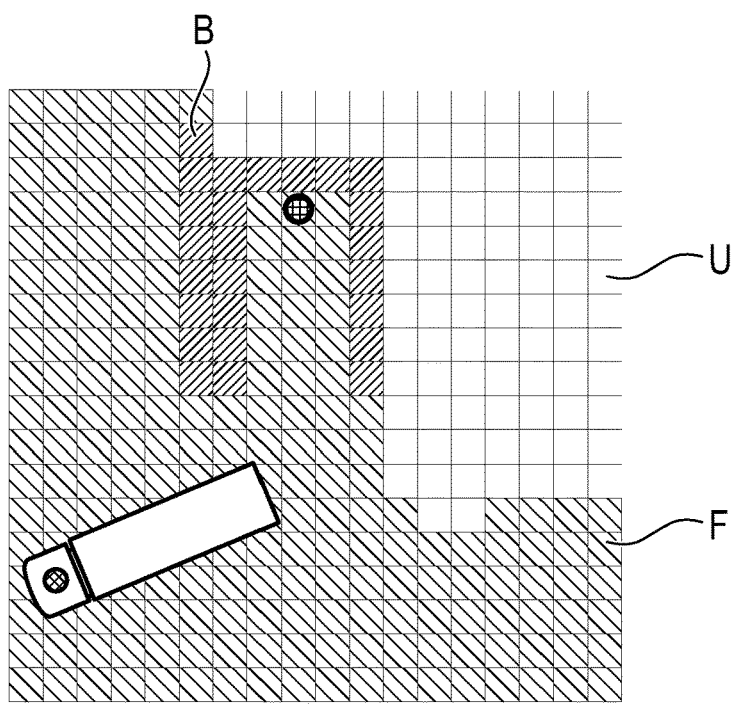
FIG. 17 shows an exemplary embodiment of a consolidated grid map while using the output signals from the onboard obstacle recognition sensor and the offboard obstacle recognition sensor, wherein the blind spot behind the semitrailer is compensated by using the offboard obstacle recognition sensor.

FIG. 13 shows a scene in which the semitrailer truck has further approached in the parking space. Moreover, the offboard obstacle recognition sensor RMTS has driven into the parking space formed by the parking space border PL3. FIG. 14 shows the resulting grid map MAP. The semitrailer truck LKW is symbolically placed within the grid map. This primarily serves for orientation, wherein the semitrailer truck LKW is not part of the grid map MAP but rather only serves for explaining this disclosure. However in an embodiment, it may also be provided that a corresponding symbolic representation of the semitrailer truck LKW is added to the grid map MAP. In the scene portrayed in FIG. 15, the semitrailer truck LKW has traveled past the parking space and is backing up to park in the parking space formed by the parking space border PL3. The particular problem in this case is portrayed by the grid map EGOM which is shown in FIG. 16 for the corresponding scene. A visual obstruction identified with reference sign SIS is discernible that results from the fact that the onboard obstacle recognition sensor EGOS is mounted on the tractor ZM of the semitrailer truck LKW and not on the semitrailer AUFL. That is, the semitrailer AUFL of the semitrailer truck LKW produces a rearward visual obstruction SIS. This is compensated by the offboard obstacle recognition sensor RMTS in the parking space as shown in the corresponding grid map MAP which is portrayed in FIG. 17.

The parking space border PL3 may also be, or respectively portray a border of a loading, or respectively unloading ramp or may be a part of such a loading or unloading ramp. It may for example be provided that the offboard obstacle recognition sensor, or respectively its drivable wheels, is/are low enough for it to drive under the semitrailer AUFL, or respectively the tractor ZUG so that it can pilot the next vehicle.

It may for example be provided that the control of the offboard obstacle recognition sensor is controlled depending on a quality while determining the alignment of the offboard obstacle recognition sensor relative to the vehicle, and/or relative to the onboard obstacle recognition sensor. This serves for example to feedback whether the vehicle is following the offboard obstacle recognition sensor in a suitable manner, and/or to ensure that the output signals of the offboard obstacle recognition sensor and the onboard obstacle recognition sensor are sufficient for determining the alignment.

The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments.

The mere fact that certain measures are recited in mutually different dependent claims or embodiments does not indicate that a combination of these measures cannot be used to advantage. Any reference signs in the claims should not be construed as limiting the scope.

What is claimed is:

1. A method for operating a vehicle assistance or control system with a vehicle and with an offboard obstacle recognition sensor for recognizing obstacles for the vehicle, wherein the vehicle includes an onboard obstacle recognition sensor for recognizing obstacles to the vehicle, comprising:
generating a first grid map relative to the offboard obstacle recognition sensor;
generating a second grid map relative to the onboard obstacle recognition sensor, or respectively relative to the vehicle; and
generating a consolidated grid map depending on the first grid map and the second grid map; wherein
the consolidated grid map is generated depending on the alignment of the offboard obstacle recognition sensor relative to the vehicle and/or relative to the onboard obstacle recognition sensor; and wherein
the alignment of the offboard obstacle recognition sensor is determined relative to the vehicle and/or relative to the onboard obstacle recognition sensor using an optimization and/or minimization of the distances between:
rotated measured values of the offboard obstacle recognition sensor and shifted measured values of the onboard obstacle recognition sensor,
rotated measured values of the onboard obstacle recognition sensor and shifted measured values of the offboard obstacle recognition sensor,
rotated and shifted measured values of the offboard obstacle recognition sensor and measured values of the onboard obstacle recognition sensor, or
rotated and shifted measured values of the onboard obstacle recognition sensor and measured values of the offboard obstacle recognition sensor.

2. The method of claim 1, wherein the state of grids that feature the vehicle as an obstacle are set as not occupied in the first grid map or in the consolidated grid map.

3. The method of claim 1, wherein the alignment of the offboard obstacle recognition sensor relative to the vehicle and/or relative to the onboard obstacle recognition sensor is determined depending on measured values from the offboard obstacle recognition sensor, and measured values from the onboard obstacle recognition sensor.

4. The method of claim 1, wherein the rotation does not include more than one degree of freedom, and the shift does not include more than two degrees of freedom.

5. The method of claim 1, wherein the offboard obstacle recognition sensor comprises a marker using which an angle of the position of the offboard obstacle recognition sensor is determined relative to a reference axis of the vehicle, in particular however not to the distance between the onboard obstacle recognition sensor and the offboard obstacle recognition sensor.

6. The method of claim 5, wherein the shift is reduced using the angle by one degree of freedom.

7. The method of claim 1, wherein a LIDAR is used as one or more of the onboard obstacle recognition sensor, and the offboard obstacle recognition sensor.

8. The method of claim 1, wherein the measured values of the offboard obstacle recognition sensor are transmitted wirelessly from the offboard obstacle recognition sensor to the onboard optical recognition sensor.

9. The method of claim 2, wherein the consolidated grid map is generated depending on the alignment of the offboard obstacle recognition sensor relative to the vehicle, and/or relative to the onboard obstacle recognition sensor.

10. The method of claim 9, wherein the alignment of the offboard obstacle recognition sensor relative to the vehicle and/or relative to the onboard obstacle recognition sensor is determined depending on measured values from the offboard obstacle recognition sensor, and measured values from the onboard obstacle recognition sensor.

11. The method of claim 9, wherein the alignment of the offboard obstacle recognition sensor is determined relative to the vehicle, and/or relative to the onboard obstacle recognition sensor using an optimization and/or minimization of the distances between:
- rotated measured values of the offboard obstacle recognition sensor and shifted measured values of the onboard obstacle recognition sensor,
- rotated measured values of the onboard obstacle recognition sensor and shifted measured values of the offboard obstacle recognition sensor,
- rotated and shifted measured values of the offboard obstacle recognition sensor and measured values of the onboard obstacle recognition sensor, or
- rotated and shifted measured values of the onboard obstacle recognition sensor and measured values of the offboard obstacle recognition sensor.

12. The method of claim 11, wherein the rotation does not include more than one degree of freedom, and the shift does not include more than two degrees of freedom.

13. The method of claim 4, wherein the offboard obstacle recognition sensor comprises a marker using which an angle of the position of the offboard obstacle recognition sensor is determined relative to a reference axis of the vehicle, in particular however not to the distance between the onboard obstacle recognition sensor and the offboard obstacle recognition sensor.

14. The method of claim 11, wherein the offboard obstacle recognition sensor comprises a marker using which an angle of the position of the offboard obstacle recognition sensor is determined relative to a reference axis of the vehicle, in particular however not to the distance between the onboard obstacle recognition sensor and the offboard obstacle recognition sensor.

15. The method of claim 12, wherein the offboard obstacle recognition sensor comprises a marker using which an angle of the position of the offboard obstacle recognition sensor is determined relative to a reference axis of the vehicle, in particular however not to the distance between the onboard obstacle recognition sensor and the offboard obstacle recognition sensor.

16. The method of claim 14, wherein the shift is reduced using the angle by one degree of freedom.

17. The method of claim 15, wherein the shift is reduced using the angle by one degree of freedom.

18. The method of claim 2, wherein a LIDAR is used as one or more of the onboard obstacle recognition sensor, and the offboard obstacle recognition sensor.

* * * * *